Sept. 16, 1941.  J. F. P. FARRAR ET AL  2,256,386
HOSE CONSTRUCTION
Filed Dec. 27, 1938
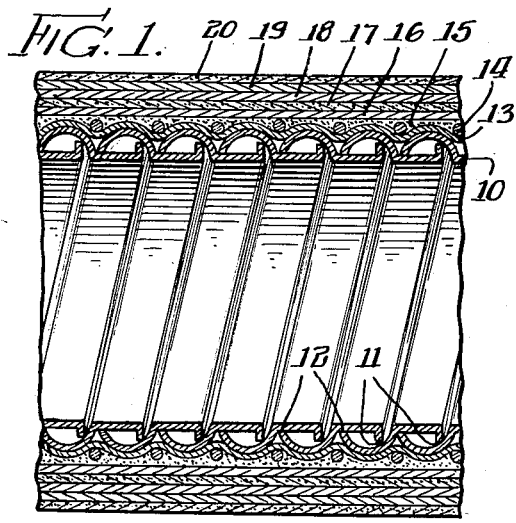
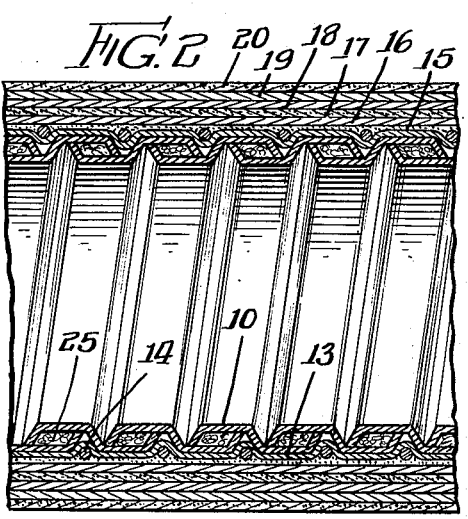
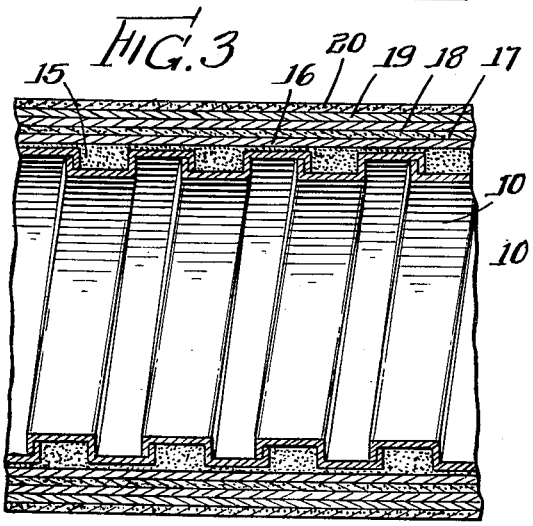
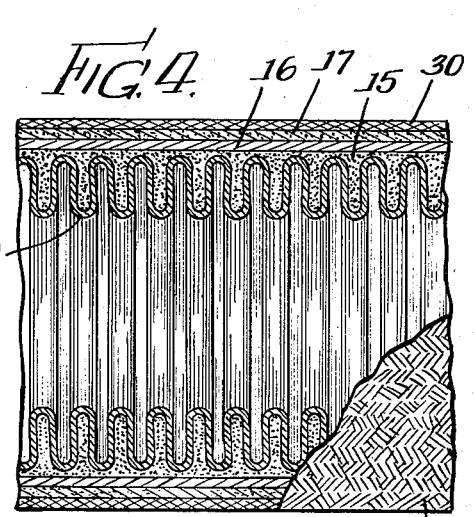
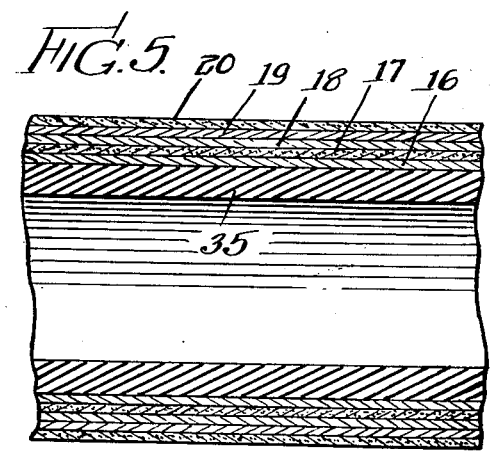
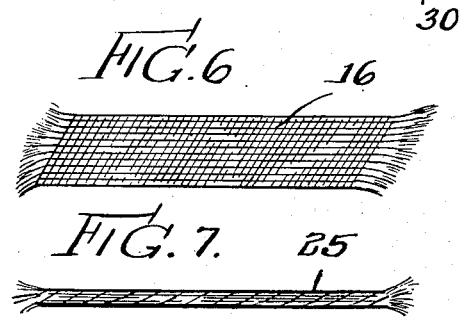
INVENTORS
John F. P. Farrar
Axel Fredrick Johnson
By: Cox & Moore ATTORNEYS Patented Sept. 16, 1941

2,256,386

UNITED STATES PATENT OFFICE 2,256,386

HOSE CONSTRUCTION

John F. P. Farrar, Barrington, and Axel Fredrick Johnson, Chicago, Ill., assignors to Chicago Metal Hose Corporation, Maywood, Ill., a corporation of Illinois Application December 27, 1938, Serial No. 247,874

2 Claims. (Cl. 138—58)

This invention relates to hose or tubing constructions, and particularly to hose and tubing of the flexible type.

It is an object of the invention to provide a flexible hose or tubing of improved construction and resistant characteristics, more particularly heat resistance and improved insulating qualities.

More specifically it is an object of the invention to provide a hose or tubing wherein fibered glass is used as an element in the structure whereby to improve its resistant characteristics while retaining flexibility in the construction.

A further object is to provide a hose or tubing of the type defined wherein lacquer and/or lacquer impregnated fabric is provided as an element in the wall structure whereby to improve the resistant and durability characteristics thereof.

Still other objects, advantages and features of the invention will appear from the following specification when taken in connection with the accompanying drawing, wherein certain preferred embodiments of the invention are illustrated.

In the drawing, wherein like reference numerals refer to like parts throughout—

Fig. 1 is a longitudinal sectional view through a piece of flexible hose or tubing fabricated in accordance with one preferred embodiment of the invention.

Fig. 2 is a view, generally similar to Fig. 1, but illustrating a modified form of hose structure;

Figs. 3, 4 and 5 are sectional views illustrating still further modified forms of the invention, and Figs. 6 and 7 are partial perspective views showing the fibered glass elements which may be used in the constructions.

Referring first to the embodiment of the invention illustrated in Fig. 1, the hose or tubing comprises a metal core 10 of the spiral interlocked strip type. In making metal tubing of this type, an elongated metal strip formed into suitable cross section, such as illustrated, is spirally wound upon itself into interlocking and engaging relation as shown. The tubing formed will be flexible within predetermined limits, the metal surfaces being slidable relative to each other as indicated at the points 11 and 12, to permit this flexibility. The manner of making flexible metal hose of this type is well known and need not be further described.

A wall 13 of cellulosic material is formed around the metal core 10, and is held in gripping engagement therewith by means of a wire or cord 14. The wall 13 may be composed of Cellophane tape spirally wrapped around the convolutions of the metal core thereby forming in effect a continuous wall of cellulosic material. The tape may be applied in the manner set forth in the patent to R. Debenedetti No. 2,045,540, issued June 23, 1936, so that it assumes an undulating or wave-like contour, as shown in Fig. 1, permitting the flexing of the hose structure without rupture to the cellulosic material. The wire or cord 14 which is wrapped spirally around the layers of Cellophane tape hold the tape in position. The tape provides an impervious wall of cellulosic material resistant to the action of hydrocarbon fluids, rendering the hose construction particularly adapted for use in transmitting gasoline, oils, and the like.

A wall 15 of lacquer is formed around the outside of the Cellophane tape, the wire or cord 14 being imbedded therein. This lacquer is preferably of the synthetic resin type having good heat resistant characteristics. The lacquer may be applied in semi-liquid or plastic condition and upon drying forms an impervious wall of limited flexibility. This wall reinforces the action of the wall 13 in sealing the hose against leakage, and provides a positive seal extending around the entire metal core. The lacquer also lends heat resistant characteristics and will be immune to hot or cold oils and varying atmospheres.

Around the lacquer wall is formed a wall 16 of fibered glass. Fibered glass, as available commercially, is glass finely drawn into fiber form, which may or may not be treated with mineral oil, textile size or the like, to facilitate its handling and processing. Such fibered or spun glass may be formed into thread and twisted into yarn as shown in Fig. 7 or woven or braided into cloth or tape as shown in Fig. 6. In such form the glass is fabricated in the nature of a textile. The yarn, cloth or tape formed from it is flexible and can be twisted or worked like other textile fabrics. In accordance with the invention the wall 16 is preferably formed of such fabricated tape or cloth spirally wound to form a substantially continuous wall structure, or the glass thread or yarn may be directly woven upon the lacquer wall 15. The fabricated glass is formed on the lacquer in such manner that it will not be impregnated with the lacquer. By this means uniform air spaces are retained between the glass fibers. The wall of fabricated glass imparts exceptional insulating characteristics to the construction, and the retained air spaces between the glass fibers increase these insulating properties. It has been found that even when the glass fabric is applied to the lacquer wall while the lacquer is in plastic or semi-fluid condition the glass fabric will not be impregnated with the lacquer to any substantial degree.

In accordance with the preferred form of construction shown in Fig. 1, a wall 17 of lacquer impregnated fabric, which may be ordinary cloth, such as cotton, linen or the like, is wrapped around the fabricated glass wall 16. The wall 17 may be braided or formed of spirally wound tape or the like to form a substantially continuous wall. Two additional walls 18 and 19 of fabricated glass are formed around the wall 17, and the entire construction is then encased in a wall 20 of lacquer impregnated fabric. The wall 20 may be formed of spirally wound tape or preferably comprises a braided sleeve.

A structure such as above described forms a flexible hose or tubing construction having very desirable resistant characteristics. The inner cellulosic and lacquer walls 13 and 15 effectively seal the metal core against leakage even when the construction is used as a conduit for the most searching fluids under pressure, including fluids of the hydrocarbon type, such as gasoline, oil, and the like. The outer wall 20 of the lacquer impregnated fabric renders the structure impervious to atmospheric and moisture conditions. The walls 16, 18 and 19 of fabricated glass impart exceptional heat resistant and insulating qualities to the structure. The hose may be subjected to intense heat over extended periods, and the fabricated glass walls with their uniform air pockets, will provide effective insulation for the metal core and sealing walls 13 and 15, preventing the break-down or rupture of these walls under the action of the heat. This characteristic is of particular advantage where the hose is used as a conduit for oil or gasoline in aircraft or the like wherein the hose may be called upon to maintain a fluid-tight conduit even though subjected to accidental fire. The multiple wall construction renders the hose resistant to high pressures. The materials of which the walls are composed will not break down or rupture due to vibration or limited flexing movement.

In Fig. 2 an embodiment of the invention is illustrated which is generally similar to that previously described except that the metal strip of which the metal core of the tubing is formed is of somewhat different cross section, and a cord 25 of fabricated glass is provided as a packing for the convolutions of the metal core. The cord 25 may be formed of fibered glass, of the type previously described, and as shown in Fig. 7. The fabricated glass packing 25 withstands high temperatures. It is resilient, rendering the metal tube convolutions tight while retaining flexibility in the hose construction. The fabricated glass is chemically stable and very resistant to corrosion and to the action of hydrocarbon fluids. It does not deteriorate with age. If desired, it can be impregnated with a sealing substance to fill the voids or spaces between the glass fibers whereby to form a more effective seal.

In Fig. 3 an embodiment of the invention is illustrated which is similar to that shown in Fig. 1 except that the metal strip of which the core convolutions are formed is of still a third form, and the lacquer wall 15 directly engages and embraces the metal core, the wall 13 of cellulosic material being eliminated. Using lacquer of the heat resistant, synthetic resin type, in certain installations the wall of cellulosic material may not be required. The lacquer forming the wall 15, which may be applied in plastic condition, finds its way into engagement with the various contours of the metal core forming an impervious seal around the core. The lacquer has sufficient flexibility to accommodate the flexing movements of the hose.

In Fig. 4 the metal core 10 of the hose is of the seamless corrugated tubing type, the core being annularly corrugated in the particular embodiment illustrated. The lacquer wall 15 directly embraces the metal core, as in the embodiment of Fig. 3. The fabricated glass wall 16 surrounds the lacquer wall 15, the glass wall in turn being encompassed within a wall 17 of lacquer impregnated fabric. In this instance the additional layers of fabricated glass have been dispensed with, and the entire structure is illustrated as being encompassed in a metal braid 30. The metal braid may be used where it is desired to render the construction particularly resistant to surface abrasion. Where the insulation requirements are not as high, the additional glass walls may not be necessary.

In Fig. 5 an embodiment of the invention is illustrated wherein the core member of the hose comprises a flexible tube 35 of rubber or the like. In this instance both the the cellulose wall and the inner lacquer wall have been eliminated, the fabricated glass wall 16 being in direct contact with the rubber tube. The construction is otherwise like that illustrated and described in connection with Fig. 1.

It is obvious that various changes may be made in the specific embodiments of the invention set forth for purposes of illustration, to suit the requirements of any particular installation, while retaining the fundamental characteristics of the invention and without departing from the spirit thereof. Accordingly the invention is not to be limited to the specific embodiments shown and described, but only as indicated in the following claims.

The invention is hereby claimed as follows:

1. A flexible hose construction comprising a flexible metal core, said core being formed of a spirally wound metal strip, fibered glass packing arranged within the convolutions of the core, a wall of cellulose encompassing the core, a spirally wound binding member encompassing the cellulose wall and serving to hold the same in sealing engagement with the edges of the spiral metal strip, an insulating wall of flexible fibered glass encompassing the cellulose, and a protecting wall encompassing the glass wall.

2. A flexible hose construction for conducting fluids and the like comprising a flexible core structure, said core structure comprising an elongated metal strip spirally wound to form a fluid conducting conduit, the edges of said strip being arranged into interlocking engagement, a continuous helically shaped body of fibered glass arranged between the interlocked strip edges, said fibered glass body forming a packing structure for the metal strip and said fibered glass body being flexible and compressive to conform to the relative movements of the convoluted strip during bending of the hose, a wall of fibered glass encompassing the core structure, said fibered glass wall being flexible to conform to the bending movements of the core structure and serving as an insulating medium for the core, and an outer cover wall of protective material encompassing the fibered glass, said outer wall also being flexible to conform to the bending movements of the fibered glass wall and core structure and serving as an abrasion protective means for the fibered glass wall.

JOHN F. P. FARRAR.
AXEL FREDRICK JOHNSON.